United States Patent [19]
Kardashian

[11] 3,925,593
[45] *Dec. 9, 1975

[54] MONOTONICALLY CHANGING SKEW IN A MAGNETOSTRICTIVE ANISOTROPIC THIN FILM PLATED WIRE LINE SENSOR

[75] Inventor: Vahram S. Kardashian, Plymouth Village, Minn.

[73] Assignee: Honeywell Inc., Minneapolis, Minn.

[ * ] Notice: The portion of the term of this patent subsequent to Feb. 18, 1992, has been disclaimed.

[22] Filed: Nov. 11, 1974

[21] Appl. No.: 522,398

[52] U.S. Cl. ............ 174/36; 174/107; 174/126 CP; 310/26; 340/258 R
[51] Int. Cl.² .................................................. H01B 7/18
[58] Field of Search...... 174/36, 102 R, 107, 113 R, 174/115, 126 R, 126 CP, 128, 102 A; 340/258 R, 261, 272, 17, 258 D; 235/3, 215; 360/26

[56] References Cited
UNITED STATES PATENTS

| | | | |
|---|---|---|---|
| 2,472,388 | 6/1949 | Thuras | 310/26 X |
| 2,490,273 | 12/1949 | Kean | 340/261 |
| 2,670,446 | 2/1954 | Turner | 310/26 |
| 2,854,583 | 9/1958 | Holbrough | 310/26 |
| 2,977,569 | 3/1961 | Harris | 340/261 |
| 3,375,511 | 3/1968 | Trimble et al. | 340/258 R |
| 3,438,021 | 4/1969 | Nelkin et al. | 340/261 |
| 3,612,924 | 10/1971 | Semmelink | 310/26 |
| 3,723,988 | 3/1973 | Kardashian | 340/258 R |
| 3,727,208 | 4/1973 | Anderson et al. | 340/258 R |

Primary Examiner—Arthur T. Grimley
Attorney, Agent, or Firm—Omund R. Dahle

[57] ABSTRACT

An improved strain responsive line sensor detection system which is selectively sensitive to motion of a mass on a surface. In a line sensor having a uniform thin film plated wire, the sensitivity of the line sensor falls off with distance of the intrusion from the source end of the line where are connected the high frequency drive and the processor electronics. In this invention, the angle of magnetization skew of the thin film plated wire is made monotonically non-uniform along its length whereby the sensitivity of the wire along its length changes to provide compensation for the losses in the plated wire thereby making it possible to extend the length of a thin film line sensor.

2 Claims, 4 Drawing Figures

MONOTONICALLY CHANGING SKEW IN A MAGNETOSTRICTIVE ANISOTROPIC THIN FILM PLATED WIRE LINE SENSOR

BACKGROUND AND SUMMARY OF THE INVENTION

The strain sensitive line sensor consists of a magnetostrictive thin film plated wire having uniaxial anisotrophy which acts as a transducer converting displacement or movement of the earth to an electrical signal. The extended length of plated wire line can be placed on the floor of a shallow trench and covered for camouflage. It will detect intrusion in the immediate vicinity of the line. In principle, the weight of the intruder or that of any other moving load on the surface of a semi-infinite solid like the ground, physically disturbs the load supporting medium. The line sensor embedded in the medium is stressed by the displacement. The resulting strain on the wire generates a signal.

The term magnetostriction is used to describe any dimensional change of a material which is associated with its magnetic behavior. Ferromagnetic bodies in particular are susceptible to dimensional changes, for instance, as a result of changes in temperature or a magnetic field. In the following description, the magnetostrictive phenomenon of interest is the converse, where changes in strain in a magnetostrictive material induces a change in its magnetic behavior as has been described in U.S. Pat. No. 3,774,134, issued Nov. 20, 1973, and assigned to the same assignee. The use of a wire having negative magnetostriction as well as one having positive magnetostriction has been generally mentioned in my U.S. Pat. No. 3,832,704, issued Aug. 27, 1974, and assigned to the same assignee as the present invention.

Magnetostrictive strain sensitive wires typically comprises a ferromagnetic permalloy plating on a conductive substrate wire such as copper-beryllium. A permalloy plating is normally defined as an alloy of nickel and iron. At or about the approximate composition 80% nickel and 20% iron permalloy has a zero magnetostrictive response while an iron rich (Fe more than about 20 percent) composition has a positive magnetostriction and a nickel rich (Ni more than about 80 percent) composition of plating has a negative magnetostriction. In addition to selecting a positive or negative magnetostriction, the degree of magnetostriction may be selected by controlling the variance of the composition away from the zero magnetostrictive composition.

In line sensor operation, a carrier frequency alternating current, sinusoidal or otherwise, the frequency of which may be in the kilohertz to megahertz range, is fed into the plated wire transducer which generates an alternating magnetic field in the permalloy plating around the circumference of the wire. The alternating current magnetic field sets the magnetization vector in the plating into oscillation which appears as a given level of signal amplitude. Upon being stressed, changes in physical properties of the wire (eg. the anisotropy field $H_k$) results in changes in the envelope of the signal amplitude. This appears as a modulation of a carrier similar in appearance to an amplitude modulation of a radio wave carrier.

In practice, the magnetostrictive plated wire is contained in an insulating flexible tube, such as a Teflon tube. The wire and tubing are within a metallic shielded braid which, in turn, is protected by electrical insulation. The current flow through the plated wire may find its return through the metallic shield. The transducer output is detected, filtered through a low pass-band filter, and amplified to produce an analog signal.

It has been shown that sensitivity of a line sensor falls off with distance. This behavior limits cable lengths. In my prior U.S. Pat. No. 3,803,549 there is taught that a monotonic change along the length of the wire of one or more of the following magnetic properties, magnetostriction coefficient, anisotropy field $H_k$, and plating thickness will improve such a wire for line sensor use. In the present invention, I have discovered that a much greater effect (orders of magnitude more effective) results from a monotonic change in the magnetization skew angle of the negative magnetostrictive plating. A monotonically increasing skew along the length of the wire increases the voltage strain response of the wire at the remote end compared with the source end so that at a given strain of the wire at or near the remote end produces a larger signal than the same strain at or near the source end. The skew direction is controlled during the plating operation by a superposed axially oriented magnetic field. Skew herein is defined as the angular measure by which the easy, or preferred, axis of the field is displaced from a circumferential direction.

In the copending application, Ser. No. 463,488, filed Apr. 24, 1974 now U.S. Pat. No. 3,882,441, and assigned to the same assignee as the present invention, and directed to a high sensitivity negative magnetostrictive thin film plated wire, there is described the effects of choosing a plated wire having one skew angle or another.

In this invention, therefore, the improved strain responsive thin film plated wire is made to have a plating of magnetostrictive coefficient which monotonically increases in skew along its length as one approaches the remote end. This monotonically increasing skew increases voltage vs. strain response in the wire at the remote end compared with the source end so that a given strain of the wire at or near the remote end produces a larger signal than the same strain of the wire at or near the source end.

DESCRIPTION

Figure 1:
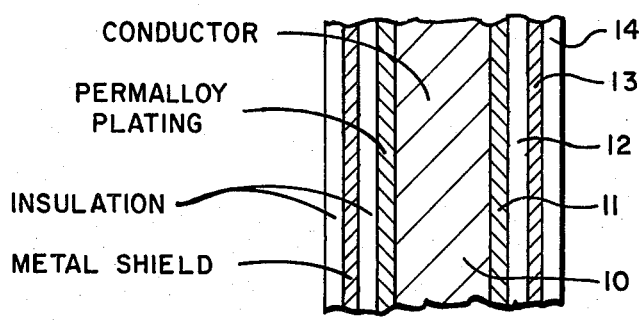
FIG. 1 is a cross section view of a section of thin film plated wire for use in an intruder detection system.

In FIG. 1, there is shown a cross section of a length of magnetostrictive thin film plated wire, such as is known in the art, and which may have, for example, a 10 mil diameter beryllium-copper substrate wire 10 which has been plated with a ferromagnitic (NiFe) permalloy film 11 having uniaxial anisotropy. In one preferred embodiment the composition is nickel rich ans has negative magnetostriction. During deposition of the ferromagntic film, a circumferential magnetic field is applied so that a preferred axis, called the easy axis, is obtained which in my previous patents usually has been oriented circumferentially about the wire or with a small skew. To produce skew, a field in the axial direction also needs to be applied. The magnetization vector M may lie along this axis in the absence of external fields and make a loop of magnetic flux around the wire. The axis perpendicular to the easy axis is called the hard axis and its direction is more nearly along the wire. The plated wire is contained in a suitable electrical insulating tube or sheath 12. A metallic shield 13, such as a braided shield surrounds the sheath 12 and an outer electrical insulation 14 provides abrasion protection.

Figure 2:
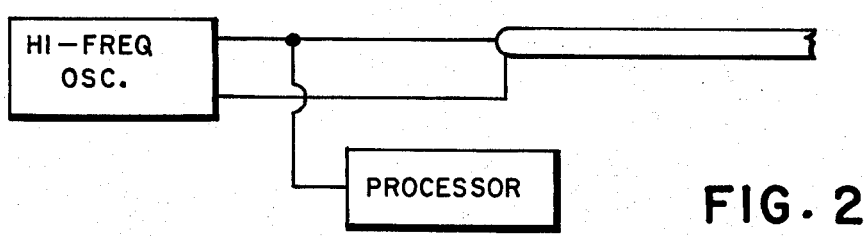
FIG. 2 is a diagrammatic showing of the intruder detector system using the improved wire.

An extended length of this magnetostrictive thin film anisotropic plated wire is used in a line sensor intruder detection system to protect a perimeter which requires surveillance. A typical system is shown in FIG. 2. The strain sensitive line sensor is emplaced in a shallow trench and covered. The system will detect intrusion in the vicinity of the line, because the weight of the intruder or that of any other moving load on the surface of the ground, a semi-infinite solid, physically disturbs the load supporting medium. The line sensor enbedded in the medium is stressed by the displacement and the resulting strain on the transducer generates a signal. The transducer output is detected, filtered through a low pass-band filter, and amplified to produce an analog signal.

In operation, a sinusoidal or other alternating current is fed into the plated wire which generates an alternating magnetic field in the permalloy plating around the circumference of the wire. The A.C. magnetic field sets the magnetization vector in the plating into oscillation, and an output or signal is observed which is sinusoidal if the current is sinusoidal and constant in amplitude. Changes in the magnetic properties of the film result in changes in the envelope of the signal amplitude. This appears as a modulation of a carrier similar in appearance to an amplitude modulation of a radio wave carrier.

When a plated wire is used which has uniform magnetic properties along its length, the sensitivity of the line sensor falls off with distance from the source end of the wire to the disturbance or intrusion thereby limiting cable lengths which can be used in a system. Another view is that the signal/noise ratio of the line is degraded with sensor length.

Figure 3:
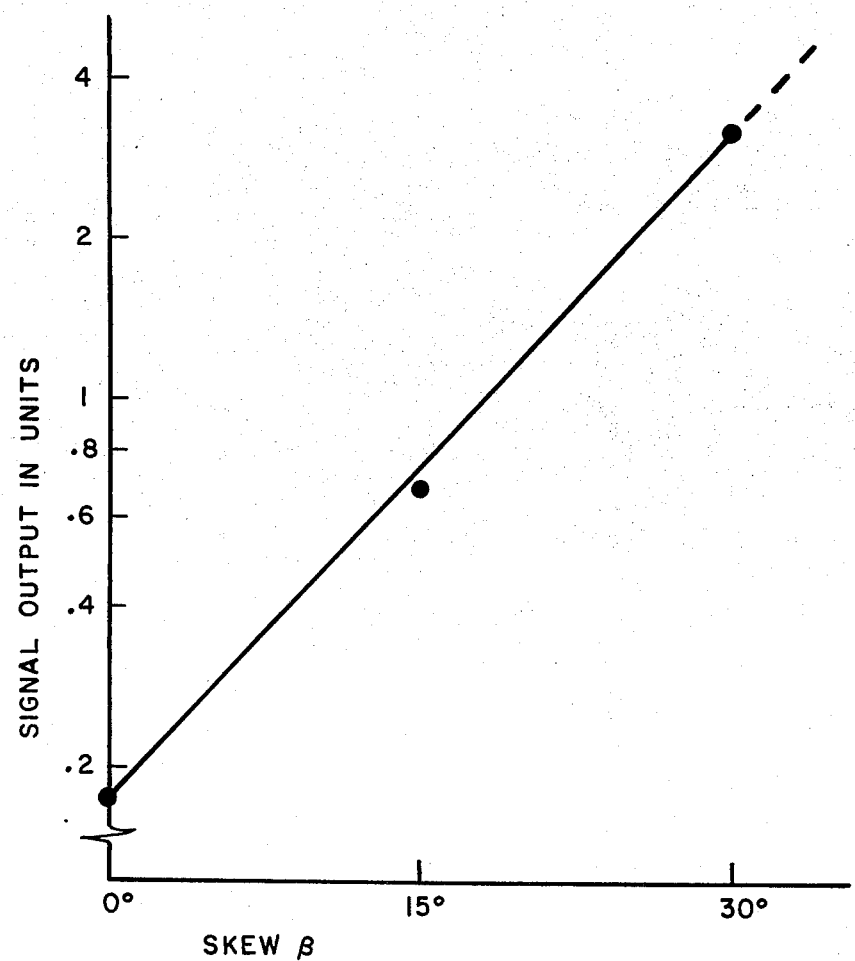
FIG. 3 is a graphical representation of wire sensitivity vs. skew.
Figure 4:
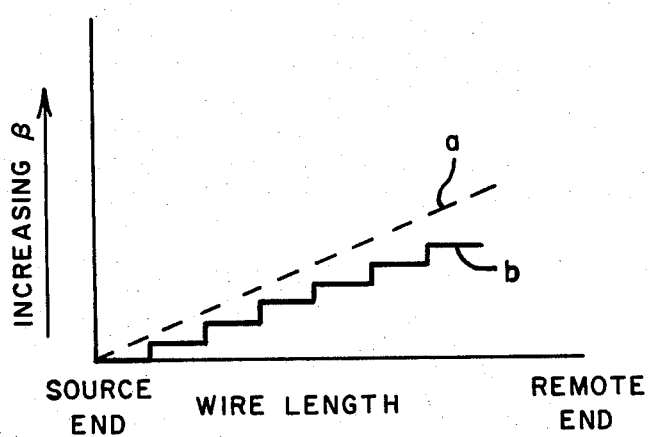
FIG. 4 is a graphical representation of skew along the wire.

In my improved magnetostrictive plated wire, the effective usable line sensor length is extended by the use of a plated wire having a monotonically varying magnetization skew angle along the length of the wire. FIG. 3 is a graphical representation of the plated wire sensitivity vs. magnetization skew angle and FIG. 4 is a graphical representation of skew angle along the wire. The ordinate axis of FIG. 3 showing electrical response of the wire is a logarithimic scale and it is clearly shown that as magnetization skew is changed from zero degrees to 30° an approximate order of magnitude increase in sensitivity occurs. FIG. 4 shows that the increasing skew can be continuously changing or in a series of steps.

The magnetic field which establishes the easy axis field of the thin film plating is applied at the time the wire is being plated. Thus in the case of the end of the wire having a skew of or about 0°, the field is applied in a direction to cause a circumferential easy axis of magnetization. By properly increasing the axial component of the field as the length of wire passes through the plating bath, a monotonically increasing magnetization skew in the anistropic film is obtained from one end of the wire to the other. This change or gradient in skew is easily incorporated into the wire because plated wire fabrication is a continuous process and the desired gradient is incorporated into the plating process. The monotonically increasing magnetization skew in the anisotropic film along the length of the wire progressively reorients the easy axis with respect to the circumferential direction of the wire.

In other words, the anisotropic thin film possesses a gradient in magnetization skew from the source end of the wire to the remote end of the wire as is shown in arrangements similar to those of FIG. 4. The greater magnetization skew of the film at the remote end of the wire causes the line sensor to possess greater sensitivity to strain at the remote location as compared to the source end of the wire. Consequently, in spite of signal losses along the line, a significant signal may be transmitted over longer cable lengths.

The embodiments of the invention in which an exclusive property or right is claimed are defined as follows:

1. An improved plated wire for use in an intrusion detection system which uses as a transducer an extended length of strain responsive anisotropic thin film plated wire, the source end of the wire being energized by the output of a high frequency oscillator and in which system because of losses in the plated wire it is desired that the voltage vs. strain response of the wire at the remote end produces a larger electrical signal at that point than the same strain at the source end, the improved plated wire comprising:

an extended length of wire substrate; and a strain responsive anisotropic magnetostrictive thin film deposit on said substrate, said deposit being monotonically varied along the length of said wire in that the magnetization skew angle is progressively increased thereby providing a controlled skew variation along the length of said wire so that the voltage vs. strain response along the length of said wire increases progressively from a relatively low level response at the source end of the wire to a relatively large response at the remote end of the wire.

2. The invention of claim 1 in which said thin film has negative magnetostriction.

* * * * *